United States Patent

[11] 3,631,302

[72] Inventor Preston Robinson
 Bulkley St., Williamstown, Mass. 01267
[21] Appl. No. 767,516
[22] Filed Oct. 14, 1968
[45] Patented Dec. 28, 1971

[54] ELECTROLYTIC DEVICE EMPLOYING SEMICONDUCTOR OXIDE ELECTROLYTE
 3 Claims, 2 Drawing Figs.
[52] U.S. Cl. .................................................. 317/230,
 204/33, 204/42
[51] Int. Cl. ................................................... H01g 9/04
[50] Field of Search .......................................... 317/230,
 231

[56] References Cited
UNITED STATES PATENTS
| | | | |
|---|---|---|---|
| 3,100,329 | 8/1963 | Sherman | 317/230 X |
| 3,254,390 | 6/1966 | Shtasel | 29/25.31 |
| 3,345,544 | 10/1967 | Metcalfe | 317/230 |
| 3,397,446 | 8/1968 | Sharp | 29/570 |

Primary Examiner—James D. Kallam
Attorney—Vincent H. Sweeney

ABSTRACT: A solid electrolyte condenser is produced by competing electrolytic reactions that produce a dielectric oxide film on an anode and an outer layer of semiconductive oxide or oxides on said film by passing current through said anode, and a suitable cathode in an aqueous electrolyte containing a film-forming anion; and an cation capable of being oxidized to a semiconductive layer on the surface of the dielectric film.

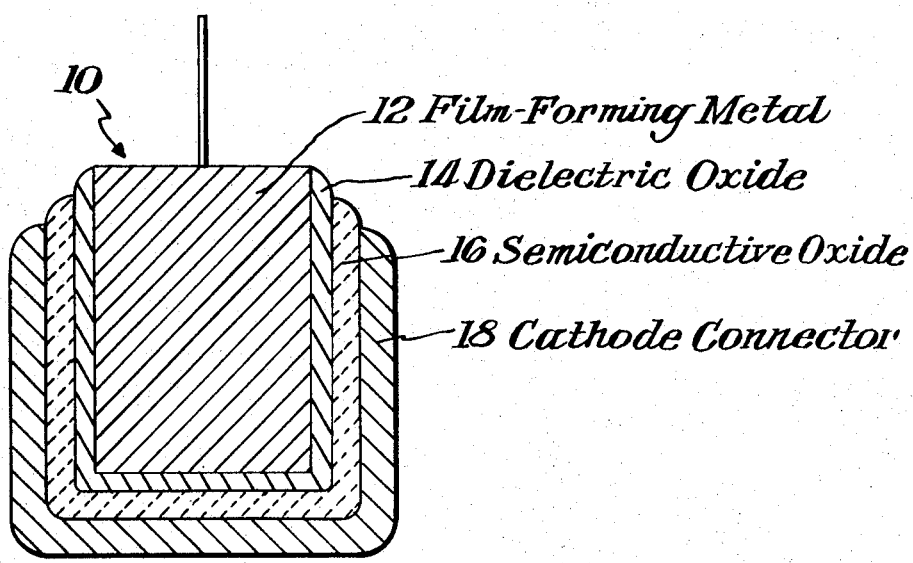

Fig.1.
- 10
- 12 Film-Forming Metal
- 14 Dielectric Oxide
- 16 Semiconductive Oxide
- 18 Cathode Connector

Fig.2.

Anodizing a film-forming metal in an electrolyte containing both a film forming anion and a semiconductive oxide forming cation to produce a dielectric oxide on said metal.

↓

Continuing anodizing in said electrolyte to produce a semiconductive oxide in intimate contact with said dielectric oxide.

↓

Continuing anodizing in said electrolyte to produce additional dielectric oxide on said metal.

ELECTROLYTIC DEVICE EMPLOYING SEMICONDUCTOR OXIDE ELECTROLYTE

BACKGROUND OF THE INVENTION

In my U.S. Pat. No. 3,066,247, I described a capacitor comprising a body of film-forming metal, a dielectric film constituting a compound of said film-forming metal on the surface of said body, a layer of a solid semiconductive material in intimate contact with said dielectric film, said semiconductive material being reducible in the presence of high fields, said film-forming metal being oxidizable upon the reduction of said semiconductor material to heal imperfections in said dielectric film and an electrically conducting layer overlying said layer of semiconductive material.

In the commercial utilization of my invention, it has been the practice to form the dielectric film in a first operation and to form the layer of solid semiconductor material in a second operation.

In some practices as in the U.S. Pat. No. 2,936,514 to R. J. Millard, it has been found that the chemical process employed to produce the layer of solid semiconductor material has had an adverse effect on the dielectric film. Thus additional means to overcome these adverse effects have been necessary. These means have usually been to connect the composite electrode as an anode in an electrolyte; and to carry out what is known in the art as a formation or reformation process, similar to the process whereby the initial dielectric film was formed.

However it has been found that the second formation process is only partially successful in overcoming the adverse effects on the dielectric film resulting from the process cited of producing the semiconductor layer. In the process described by Millard these effects are not particularly noticeable in the example he gives; the initial dielectric film is formed to 12 v. (volts) and after the deposition of the semiconductor layer, the second and subsequent reformation also can be carried up to 12 v.

When however, higher voltages are involved the results are quite different. In an extreme example, if the first dielectric layer is formed to 350 v. and the processing of the semiconducting layer is carried out, the subsequent electrolytic formation rarely can exceed 125 v., above which some reactions not fully understood take place. A hypothesis, by which I do not wish to be bound, is that evolution of oxygen at the anode causes some local separation of the layers, whereupon destructive arcing occurs. While the device which is reformed to 125 v., has great utility, it leaves much to be desired, in that the capacity of the condenser so made is only about one third that attainable with the same amount of material. In applications where the voltage exceeds 100 v., the expedient of connecting capacitors in series must be employed, a practice which, while technically satisfactory, is extremely wasteful of material.

SUMMARY OF THE INVENTION

I have found means whereby the formation of the dielectric film, of the semiconductor layer, and any repair of the dielectric film necessary can be carried out in one operation, permitting the construction of condensers rated higher than 100 v. In my process there are apparently two competing electrolytic reactions, the formation of the dielectric film and the formation of the semiconductor layer, and these usually take place at different speeds. In one example of my process, the formation of the dielectric film initially is more rapid than the formation of the semiconductor layer up to some critical voltage depending on the concentration and nature of the electrolyte. The formation of the semiconductor layer then takes place together with some additional formation of dielectric film, and in the final stage the formation of the dielectric film again becomes dominant.

BRIEF DESCRIPTION OF THE DRAWING

FIG. 1 is a cross section of a capacitor constructed in accordance with this invention; and FIG. 2 is a flow sheet of the method of this invention by which the capacitor of FIG. 1 is produced.

DESCRIPTION OF THE PREFERRED EMBODIMENTS

FIG. 1 shows a capacitor 10 of this invention having a film-forming metal anode 12 with a dielectric oxide 14 formed thereon. A semiconductive oxide is formed in intimate contact with dielectric oxide 14, and a cathode connector 18 is provided over semiconductive oxide 16.

Example 1

An electrolyte is made up containing 8 grams per liter ammonium dihydrogen phosphate and 8 grams per liter of lead acetate. A fine white precipitate of a lead salt is formed which is maintained in suspension by suitable agitation and the resulting electrolyte has a pH in the region of 5 to 5.5. A porous tantalum anode weighing 0.75 grams is made the anode in this electrolyte, and a suitable cathode which may be carbon is provided. On passing a direct current of 100 milliamperes between the electrodes, the voltage increases steadily in 9 or 10 minutes to a voltage in the neighborhood of 175 to 200 v. and this is the formation of a dielectric layer. At this point the formation of the semiconductor layer begins and at a current of 100 milliamperes the voltage drops to the neighborhood of 125 v. and over a period of 10 minutes increases again to the former voltage of between 175 and 200 v. and this is primarily the formation of the semiconductor layer. Subsequently at the same current, the voltage rises more rapidly to the neighborhood of 300 v. which is close to what is known in the art as the breakdown voltage of the electrolyte. When this voltage is maintained constantly for a few minutes, the current drops rapidly form 100 milliamperes to below 10 milliamperes.

Example 2

An electrolyte is made up of 4 grams per liter ammonium dihydrogen phosphate, 4 grams of phosphoric acid and 8 grams of manganese carbonate. Part of the manganese carbonate remains in suspension and part reacts with the acid solution giving manganous ions and evolving carbon dioxide. Again the pH is in the neighborhood of 5 to 5.5. The current-voltage curves are quite similar to those obtained in example 1. The essential difference is that whereas in example 1 the semiconductor layer was lead dioxide, the semiconductor layer in this example is manganese dioxide.

If aluminum anodes are substituted for tantalum anodes and the process is carried out as described similar results are obtained, but however there is a third competing reaction, the formation of aluminum hydroxide which is not desirable. This competing reaction however can be suppressed by increasing the pH of the electrolyte to the neighborhood of 7, by adding ammonium hydroxide, an amine or alkali to give the higher pH. Since however this formation of aluminum hydroxide takes place at the air line between the electrolyte and the air, I may substitute a Ta wire for the Al wire and embed this tantalum wire in the porous Al anode and then use the same electrolytes as for Ta anodes.

The electrodes from the foregoing example are then made into condensers by adding suitable cathode material such as suspension of graphite (aquadag) followed by the application of a conductor which may be silver in the form of paste or other conductor provided by flame spraying or sputtering. The assembly is then suitably dried to remove the last traces of solvent employed in the various process and assembled in a suitable container. The anode from example 1 has the following characteristics: a leakage current of 1 milliampere and a capacity of 5.0 microfarads; an abide from example 2 has these characteristics: a leakage current of 920 microamperes and a capacity of 2.2 microfarads.

While these condensers have utility, it may be desirable in some cases to employ a thicker semiconductor layer because of the rough handling which may result in assembly operations. This may be accomplished by employing electrolytes containing higher concentrations of the anion which goes to form a semiconductor layer.

Example 3

A solution is made containing 8 grams per liter of nickel acetate, 2 grams per liter of ammonium dihydrogen phosphate. When a porous tantalum anode as described above is used, and a current of 100 milliamperes is used, the voltage rises slowly reaching 70 volts in 46 minutes, forming a semiconducting layer of nickel sesquioxide on the surfaces of the anode. This coated anode is subjected to the treatment of example 2 and gives a condenser of these characteristics: 0.1 microamperes and a capacity of 2.2 microfarads.

Example 4

A solution of 8 grams per liter of lead acetate is neutralized with ammonia or alkali until a slight permanent precipitate is formed. A Ta electrode as used above, is made the cathode in this bath, a suitable anode is carbon, and a current of 100 milliamperes is passed for one minute. The Ta electrode is now coated with lead hydroxide is then subjected to the process of example 2 giving characteristics: 350 microamperes and a capacity of 8.5 microfarads.

What is claimed is:

1. An electrolytic capacitor comprising an anode of film-forming metal, a dielectric oxide film formed on the surface of said anode, a reducible semiconductive oxide electrolyte in intimate contact with said dielectric film, and a conductive cathode connector in contact with said oxide electrolyte, said dielectric film and said semiconductive oxide electrolyte being in situ formed in one continuous electrolytic formation of said anode in a single solution containing both a film forming anion and a semiconductive oxide forming cation.

2. The device of claim 1 wherein said anode is a member of the group consisting of aluminum and tantalum; said film-forming anion is a member of the group consisting of phosphate, borate, and sulfamate; and said semiconductive oxide-forming cation is a member of the group consisting of Mn, Ni, and Pb.

3. A method of making an electrolytic device having a film-forming anode coated with a dielectric film and a superimposed semiconductive layer comprising the steps of anodizing said anode in an electrolyte containing both a film-forming anion and a semiconductive oxide-forming cation to produce said dielectric film, continuing anodization in said electrolyte to produce said semiconducting oxide layer in intimate contact with said dielectric film, continuing anodization in said electrolyte still further to produce additional dielectric film, and making connections to said anode and to said semiconducting oxide layer.

* * * * *